F. H. HOPKINS.
FLUID REGULATOR.
APPLICATION FILED OCT. 26, 1916.
1,309,203.
Patented July 8, 1919.
2 SHEETS—SHEET 2.
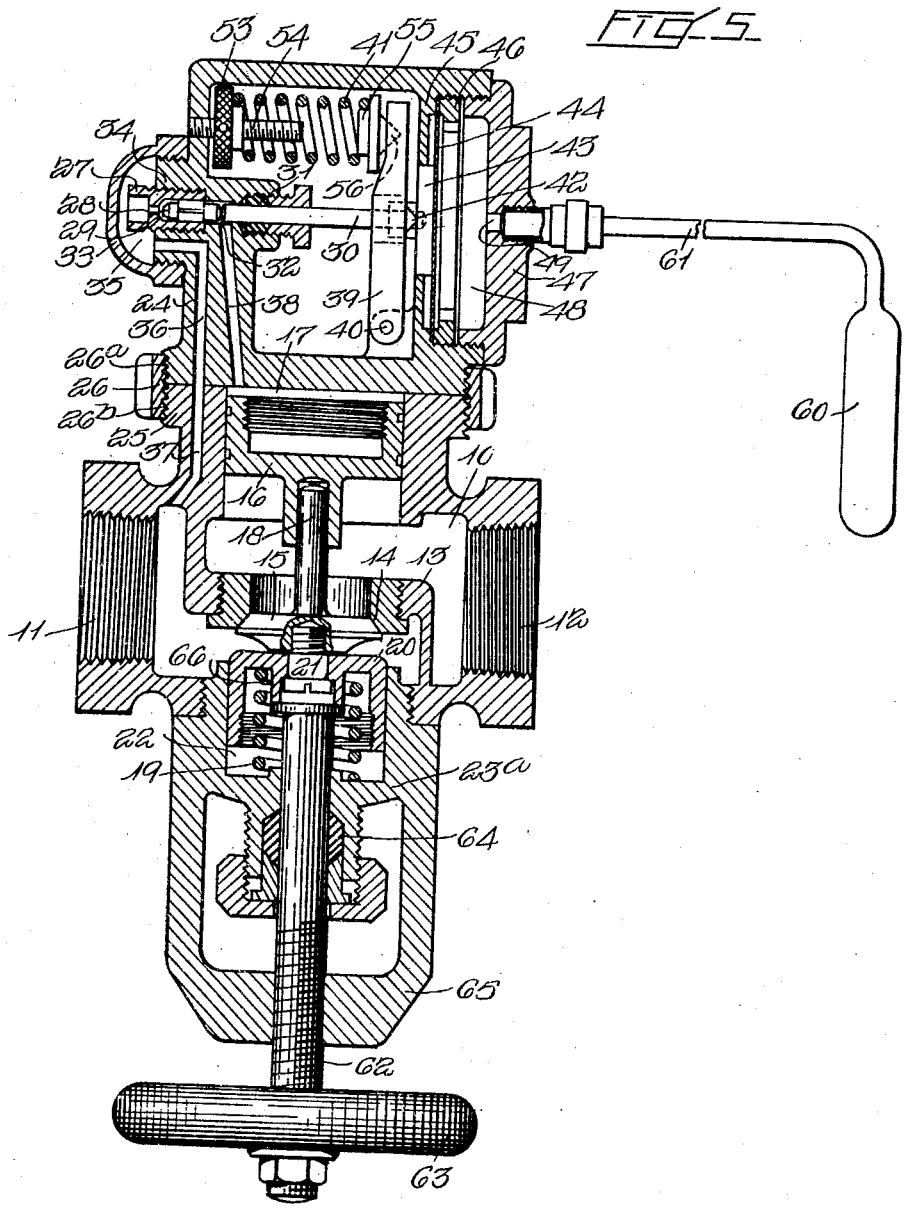
INVENTOR:
FRANK H. HOPKINS
By
ATTORNEYS

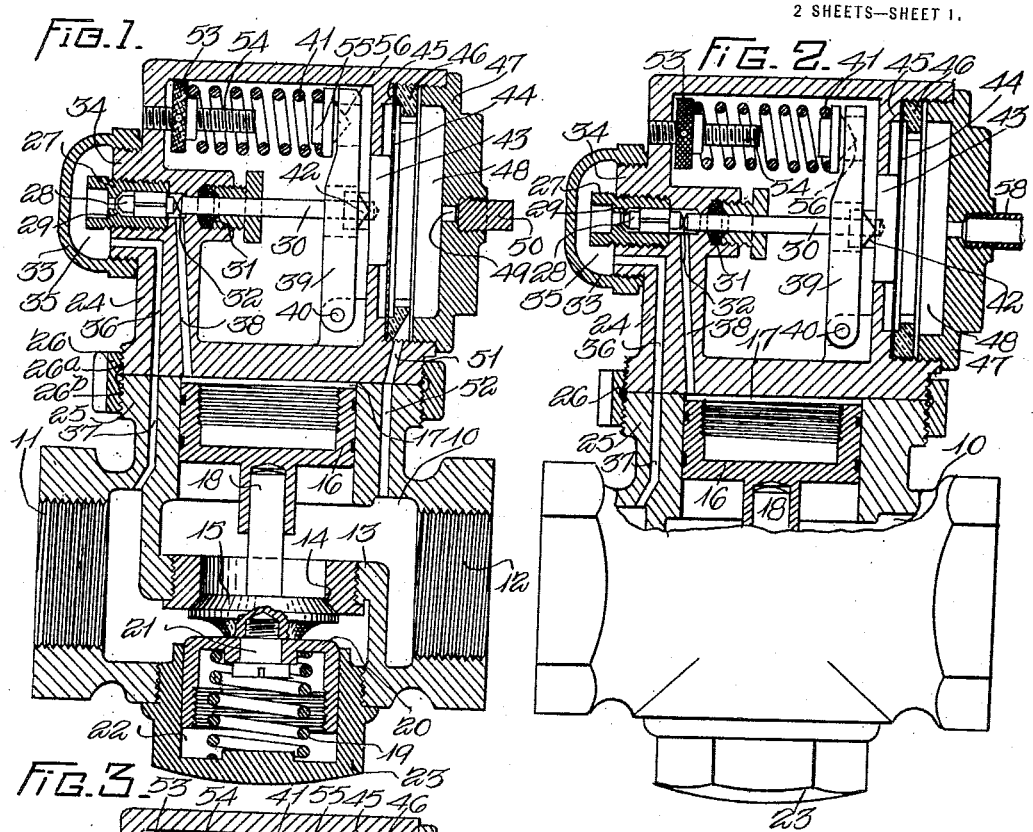
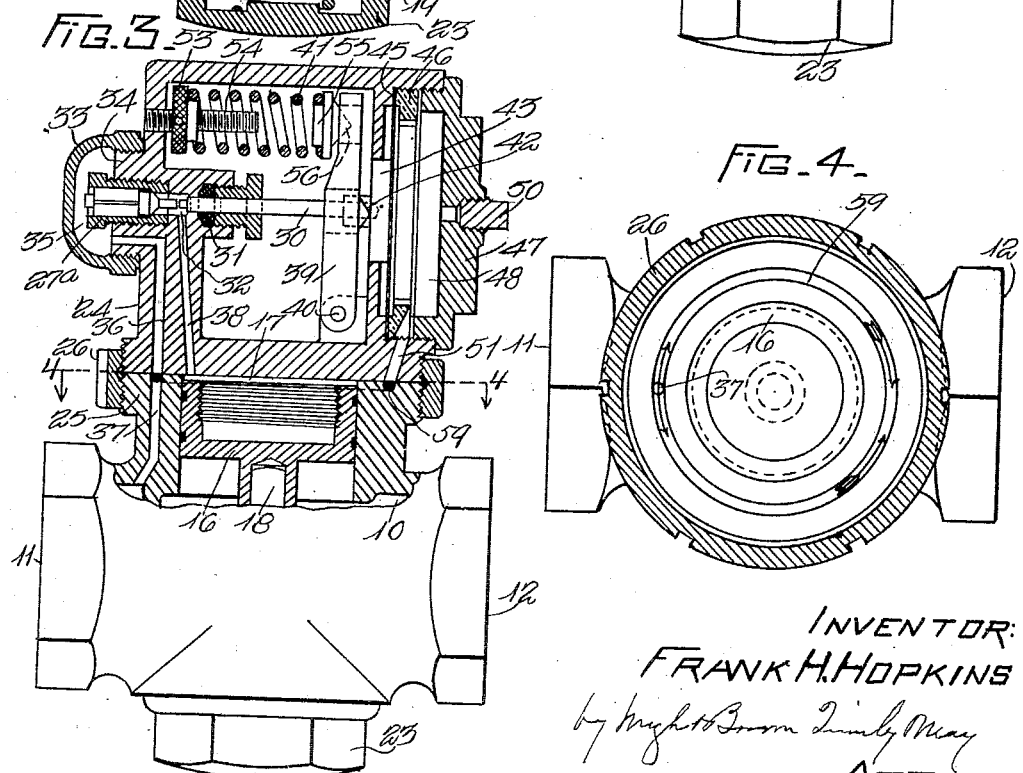

UNITED STATES PATENT OFFICE.

FRANK H. HOPKINS, OF SOMERVILLE, MASSACHUSETTS, ASSIGNOR TO AMERICAN STEAM GAUGE & VALVE MANUFACTURING COMPANY, OF BOSTON, MASSACHUSETTS, A CORPORATION OF MASSACHUSETTS.

FLUID-REGULATOR.

1,309,203.  Specification of Letters Patent. Patented July 8, 1919.

Application filed October 26, 1916. Serial No. 127,825.

*To all whom it may concern:*

Be it known that I, FRANK H. HOPKINS, a citizen of the United States, residing at Somerville, in the county of Middlesex and State of Massachusetts, have invented new and useful Improvements in Fluid-Regulators, of which the following is a specification.

The present invention has reference to means and devices for regulating or governing the passage or flow of fluids containing heat or pressure, or both heat and pressure. Among the purposes for which the invention is adapted to be used are the following: First, that of a pressure regulator or reducing valve for delivering at a given regulated pressure fluid supplied at a higher pressure or at a pressure which may be variable; second, that of a temperature regulator by which a heat carrying fluid may be supplied for heating purposes in such a manner as to maintain a constant temperature of desired degree; third, that of a relief valve or pressure relieving device by which fluid confined under pressure may be allowed to escape when the pressure mounts above a given intensity; and fourth that of a pump governor to control the pressure developed by a steam or other automatic fluid-operated pump. In all of the embodiments of the invention here shown the control or regulation is effected by the operation of a valve interposed in a pipe line through which a pressure-carrying or heat-containing fluid is caused to pass, and the regulator is applied to actuate said valve in a manner to open or close the same to varying extents. This embodiment of the invention may therefore also be considered as a valve controlling device operable not only for the specific purposes above indicated but for other purposes which may be served by the automatic control of a valve in a pipe line. In the following specification and the drawings forming a part thereof the principles of the invention are shown in an apparatus which embodies the preferred form of such principles, with modifications adapted to serve the purposes above specifically named; but such illustration is not intended as a limitation of the invention to these particular purposes or to the specific construction and the modifications thereof here shown. So far as the same are embraced within the terms of the appended claims my present invention includes all concrete embodiments, whether substantially like or unlike the particular constructions here illustrated, containing essentially the same fundamental idea of means, and operating according to the principles hereinafter set forth. I also claim the details of construction and arrangement especially illustrated herein, as a subsidiary part of the invention.

The invention consists in a regulator adapted to be applied to a main controlling valve and includes a pilot valve controlled by pressure or temperature for admitting working fluid to operate said main valve; and it also comprises the combination of such main valve with a motor element for the same and the regulator in association therewith. The principles underlying this device are the same as those exemplified in one form of the invention shown in my prior application for pressure regulating device filed September 13, 1915, Serial Number 50,538, and as to all of the subject matter which is common to the two applications, the present one is a continuation of the prior application above identified.

In the drawings, Figure 1 represents a central section of an instrument embodying my invention constructed as a pressure regulator.

Fig. 2 is a similar view showing the modification of the instrument designed to serve as a pump governor.

Fig. 3 is a similar view of a modification arranged as a relief valve.

Fig. 4 is a cross section on line 4—4 of Fig. 3.

Fig. 5 is a similar view showing the device modified to serve as a temperature regulator.

The same reference characters indicate the same parts in all the figures.

It will be assumed for the purposes of this description that the apparatus is designed to control the passage of steam from a source of supply to the point of use or delivery, and in the following specification such fluid will be referred to as steam for convenience, and also because the device will be used probably to a larger extent for controlling steam than for controlling other fluids. Such characterization is not to be construed as a limitation of the invention to any particular use however, since it is equally useful to control the flow or supply of any other fluid, whether a vapor, a gas or a liquid.

Referring first to Fig. 1, 10 represents a valve having an inlet 11, outlet 12, a partition 13, in which is a valve seat 14, and a valve 15, the latter being the main valve which is controlled by the pilot valve hereinafter described. A piston 16 works in a cylinder or equivalent working chamber 17 and is secured to the stem 18 of the valve. When pressure is applied to the upper side of this piston the same is moved in the direction which opens the valve. A spring 19 presses against the valve toward the seat and yieldingly resists the pressure acting upon the piston, closing the valve when such pressure becomes less than the force of the spring. This spring presses against a piston 20 which is secured to the under side of the valve, that is the side away from the valve seat 14, by a screw 21. Piston 20 fits slidingly in a chamber 22 which serves as a dash pot to prevent sudden fluctuations of the valve, making its operation more steady. Said chamber 22 is contained in a cap 23 which is screwed into the valve casing, and the outer wall of which serves as the reaction abutment for the spring 19.

Apparatus for regulating or controlling the operation of the valve consists of a frame 24 which is mounted on a branch 25 of the valve casing, preferably by means of a coupling nut 26, in a detachable manner. Mounted on this frame is a thimble 27 which is threaded into a recess in one end of the frame as shown, and contains a pilot valve 28. The said thimble is open from end to end and has an internal shoulder 29 formed as a valve seat to co-act with the valve 28. In line with the stem of valve 28 is a rod 30 which passes through a stuffing box 31 in one wall of the frame 24 into a chamber 32 in such wall and into contact with the valve stem. Said rod is approximately in line with the valve stem and is movable endwise so as to close the valve against its seat when moved as hereinafter described.

A cap 33 is detachably screwed on a boss 34 on the frame and surrounds the outer end of the thimble 27, providing a fluid tight chamber 35 into which the passage through said thimble opens. There is a port or passage 36 in the adjacent side of the frame which opens into the chamber 35, and is in communication with and continuation of a port a passage 37 in the valve casing opening into the interior of said casing on the admission side of the main valve. A second port or passage 38 in the frame runs from the chamber 32 therein to the cylinder 17 on the upper side of the piston 16, that is the side of the piston away from the main valve.

The rod 30 is connected to a lever 39 pivoted at a fixed point 40 on the frame 24. This lever is urged away from the pilot valve 28 by a spring 41. On the opposite side of the lever 39 from the spring 41 are knife edge bearings 42 alined with the rod 30 and pressing against a diaphragm follower 43 which bears against a diaphragm 44. Said diaphragm is secured against a shoulder 45 on the frame by an annular clamp nut 46 which is threaded into a recess in the frame. Such recess is covered by a cap or removable wall 47 which provides a diaphragm chamber 48. Said cap or wall is provided with a through port 49 closed by a removable plug 50.

In the wall of the frame 24 next to the main valve casing and opening into the diaphragm chamber 48 is a port 51 alined and communicating with a passage or port 52 in the valve casing which opens at the delivery side of the main valve.

It will be appreciated that the fluid on the pressure side of the main valve is admitted to the chamber 35 and that it presses against the pilot valve 28 with tendency to move the latter away from the seat 29. The spring 41 presses in the same direction on the lever 39, so that said lever is caused to withdraw the rod 30 and leave the valve 28 free to open, at all times except when the pressure acting in the opposite direction on diaphragm 44 is great enough to overcome the force of the spring. Said spring may be adjusted and its force regulated by adjustment of its reaction abutment 53, which is a collar threaded on a screw stud 54 set into part of the frame. Said frame, it should be noted, is open at one or both sides, giving access to said collar permitting the same to be adjusted. The spring acts on the lever 39 through a button or follower 55 which has a cone point 56 bearing at the bottom or apex of a conical socket in the lever as shown by dotted lines, which is in the axis of the helix on which the spring 41 is formed. The centralized point application of pressure of the spring, and the knife edge bearings 42 in the line of thrust of the rod 30 enable the lever 39 to be operated with the minimum of friction and without causing the rod 30 to bind.

The pressure on the delivery side of the main valve transmitted through the ports 52 and 51 to the diaphragm chamber 48 accomplishes the regulation of the main valve 15, by partly or wholly closing the pilot valve 28 when the pressure effect on the diaphragm is greater than the resistance of spring 41, and allowing the pilot valve to be opened when such pressure effect is less than that of the spring. Opening of the pilot valve allows steam to enter the cylinder 17 and press on the piston 16 with the effect of opening valve 15 against the resistance of its closing spring 19; while the closing or partial closing of pilot valve 28 has the contrary effect and allows the main valve to be moved toward its seat in proportion to the closing of the pilot valve.

The piston 16 is not packed, and therefore does not prevent leakage between its sides and the cylinder walls. The leakage thus permitted is not rapid enough to prevent operation of the piston even under a very slight opening of the pilot valve, but it is great enough to permit the pressure to become equal to the delivery pressure when the pilot valve is closed, or to be reduced when said valve is partly closed from a more widely open position, so as to permit positioning of the main valve in accordance with the position of the pilot valve.

The regulator constructed and operating essentially as above described enables steam, or any other fluid, to be delivered at any given constant and uniform pressure, even though it be supplied at a much higher or a fluctuating pressure, it being of course understood that the delivery pressure can never be higher than the supply pressure.

In the aplication of the instrument above described for use as a pump governor, the ports 51 and 52 are omitted or plugged up, and the plug 50 in the diaphragm chamber cover is removed, its place being supplied by a pipe 58 which is connected to the pressure cylinder or the delivery line of a pump, in essentially the same manner as described in my application Serial No. 50,538 aforesaid, to which reference is made for such further explanation of this feature as may be needed. The pressure in the delivery side of the pump acts on the diaphragm 44 with the effect already described, and in the same way as the steam pressure at the delivery side of the valve as described in connection with Fig. 1. In all other respects the modification adapted to serve as a pump governor, which is shown in Fig. 2, is identical with the form shown in Fig. 1.

A modification of the invention serving the use of a relief valve is shown in Figs. 3 and 4. In such modification the port 52 of Fig. 1 is omitted or plugged, and in place thereof there is provided a circular groove 59 in the upper face of the valve casing into which both the port 37 in the valve casing and the port 51 in the frame open. The position of the pilot valve is reversed from that shown in the other figures and a thimble 27$^a$ having a valve seat reversed to coact with the reversed pilot valve is substituted for the thimble 27. In consequence the steam pressure on the pressure side of the main valve tends to close the pilot valve, and the latter is opened only when the fluid pressure effect on the diaphragm 44 exceeds the force of spring 41. The main valve is then adapted to control a relief outlet in a system containing fluid under pressure. The pressure of such fluid is transmitted through the port 37, groove 59, and port 51 to the diaphragm, and when it exceeds the limit for which the instrument is set, it moves the diaphragm, opening the pilot valve and allowing the pressure to act on piston 16 and open the main valve, whereby enough of the fluid is allowed to escape to relieve the excess of pressure. In all other respects the construction and operation of this modification are the same as that shown in Fig. 1.

The temperature regulator shown in Fig. 5 is adapted to be used in any heating system where heat is furnished by steam or any other heated fluid. The pilot valve, governing diaphragm, connections for operating the pilot valve and the supply to the main valve piston are the same as in Fig. 2. A bulb 60 is in communication by a pipe 61, similar to the pipe 58 in Fig. 2, with the diaphragm chamber, and such chamber, pipe, and bulb are filled with fluid, which may be either liquid or gaseous. The bulb is placed at the point where the given temperature is required to be maintained, and its contained fluid expands and contracts with temperature changes, controlling the pilot valve and thereby the main valve in the same manner as already described.

In Fig. 5 also I have shown a means for manually operating the main valve 15, such means comprising a stem 62 carrying a hand wheel 63 and passing through a stuffing box 64 in the cap 23$^a$ which is substituted then for the cap 23 previously described. Connected, either integrally or otherwise, with the cap 23$^a$ is a yoke 65 having a threaded aperture which engages threads on the stem 62. Except for the stuffing box and yoke, the cap 23$^a$ is the same as the cap 23, and serves the same purposes of an abutment for the spring 19 and a dash pot chamber for the piston 20. The stem 62 bears against a flange 66 on the dash pot piston 20 surrounding the head of screw 21, whereby positive pressure may be applied to the valve 15 for closing it, or the stem may be used as a positive stop to limit the extent of maximum valve opening. It is evident that the manual actuating means may be applied to the main valve of any of the other forms of the invention already described.

The principles of the invention hereinbefore described are identical with those embodied in the form of regulator illustrated in Fig. 4 of my prior application, Serial Number 50,538 hereinbefore mentioned, with the single exception that an automatic stop or emergency lock for the governor is not shown in the present application. In other words the combination which consists of a main valve, a fluid operated piston for the valve, an opposed spring, a dash pot connected to the valve, and a regulator including a diaphragm and a pilot valve operated by the diaphragm for controlling the admission of working fluid to the piston of the main valve, together with necessary auxiliary parts, are common to the two applications, and are claimed in the present application, as a continuation of the aforesaid application No. 50,538.

I also claim the novel structural features of the particular apparatus here claimed, and especially that arrangement which makes the pilot valve readily accessible. Mention has already been made of the cap 33 which incloses the chamber 35 wherein is located the thimble containing the pilot valve. Such cap may be easily removed by unscrewing it from the boss 34, and thereby the valve-containing thimble is exposed. The latter has a projecting end which may be engaged by a wrench to unscrew it from the frame, thus giving access to the pilot valve. In the form shown in Fig. 3 it is not necessary even to unscrew the thimble to give access to the valve, for the latter is exposed and removable as soon as the cap is removed. The arrangement of the diaphragm, spring, and transmission lever are determined by considerations of convenience and economy of space. Lever 39 is necessary only in order to apply the thrust of a spring which is at one side of the operating rod 30. This location of the spring, however, enables a spring of less stiffness and power to be used than would be required if applied in the line of thrust of the rod 30 to act directly against the diaphragm. It is to be understood, however, that I do not restrict my invention to these details.

Another important practical feature resides in the coupling ring 26 which is threaded upon both the valve casing and the base of the controller frame. This ring has two threaded zones 26ª and 26ᵇ of which the threads have different pitches, although of the same direction, that is, either both right hand or both left hand. Thereby rotation of the ring draws the frame tightly against the valve casing without turning the frame. It is possible thus to bring the communicating ports in the frame and the valve casing into exact alinement, and thereafter draw these parts tightly together without destroying such alinement.

While I have shown and described a diaphragm, specifically the diaphragm 44, as the means for applying the regulating or controlling pressure to operate the pilot valve, it is of course to be understood that I do not limit this part of the invention to a diaphragm specifically. A diaphragm is merely one form of motive element adapted to be moved by fluid pressure, and as here applied it is the movable wall of a pressure chamber containing motive fluid. For some purposes, and particularly in instances where the amount of movement required is not very great, the diaphragm is the best form of motive element known to me, in that it may be joined in a fluid tight manner to the walls of the pressure chamber. Any other motive element, such for example, as a piston or a plunger or other element mounted to be moved under the pressure of an actuating fluid is equally within the protection which I claim.

What I claim and desire to secure by Letters Patent is:

1. The combination with a valve casing, a valve therein, and a piston connected to said valve and being movably contained in a chamber in the valve casing, of a controller comprising a frame having opposite side members so mounted on the valve casing that the side members extend outwardly therefrom, there being in one of the side members a passage running to the piston-containing chamber and in the other a pressure chamber, a diaphragm forming a movable wall for said pressure chamber, a pilot valve movably disposed to open and close said passage, a rod passing from the diaphragm to the pilot valve for moving the latter in correspondence to movements of the former, and a spring arranged between said side members, reacting against one of them and applying force to the rod in opposition to the force applied on the diaphragm by pressure in said pressure chamber.

2. A controller of the character indicated comprising a frame having a fluid conducting passage, a control valve interposed in said passage, an operating stem arranged to govern the position of said valve, a member constituting the movable wall of a pressure chamber operatively engaged with said stem to move the same, a lever connected with said stem, and a spring arranged beside said rod to act on said lever in opposition to the pressure applied by said movable wall.

3. A controller of the character indicated comprising a frame having a fluid conducting passage, a control valve interposed in said passage, an operating stem arranged to govern the position of said valve, a member constituting the movable wall of a pressure chamber operatively engaged with said stem to move the same, a lever connected with said rod, and a spring arranged to act on said lever in opposition to the pressure applied by said movable wall, a knife edge bearing between said lever and said movable wall, and a conical block arranged to apply the pressure of the spring at a point upon said lever.

4. A controller for a valve, comprising a frame having passages and a threaded socket into which one of said passages opens, the other passage and said socket opening at an external surface of said frame, a thimble having an interior valve seat screwed into said socket, a valve in said thimble coacting with said seat for opening and closing the passage through the same, and a detachable cap inclosing a communicating chamber in which said socket and one of the passages open, removal of said cap giving access to the valve.

5. A controller comprising in its construction, a frame having passages both of which open at adjacent points in an external surface of the frame, a detachable valve seat member with a coöperating valve placed in one of said passages for obstructing and opening the same, and a cap mounted on such external wall inclosing the external orifices of said passages, forming a communicating chamber between the passages, and being removable to permit free access to the valve.

6. The combination with a valve having an operating piston and a port opening through the valve casing at one side thereof, of a regulator comprising a frame detachably mounted on the valve with passages therein, one of which communicates with the aforesaid port and the other leads to said valve-operating piston, a valve seat in said frame with which both passages communicate, a pilot valve coacting with said seat, a pressure chamber at the opposite side of the frame from said valve, a movable wall closing part of said chamber, a rod bearing upon said wall and extending into proximity with the valve to transmit pressure thereto from the wall, a lever having a bearing upon said movable wall, and a spring interposed between said lever and that part of the frame in which said pilot valve is located, arranged to exert force against said lever in the direction opposite to that in which force is exerted thereon by said movable wall, and provisions for admitting fluid under pressure to said chamber.

7. A valve controller comprising a frame having opposite side members and adapted to be mounted upon a valve casing, one of the members of said frame having passages, a removable thimble containing a valve seat between said passages, and a valve co-acting with said seat, the opposite side member of the frame having a recess forming a diaphragm chamber, a diaphragm in said chamber, a cover for the chamber, a rod extending from said diaphragm across the frame into proximity to said valve, means for packing said rod to prevent flow of fluid past the same to or from the valve, a lever pivoted near the diaphragm chamber and pressed upon at a point between its ends by said diaphragm, and a spring pressing against the movable end portion of said lever and confined between the latter and that side member of the frame in which the valve is located.

8. A valve controller comprising a frame having opposite side members, an external boss on one of said members, a socket and passage in said member opening through the outer face of said boss, the said member containing a second passage opening into said socket, a cover attached to said boss in a fluid tight manner inclosing the orifice of the first named passage and the socket, a tube or thimble having an internal valve seat detachably hung in said socket, a valve in the thimble co-acting with said seat, the opposite side of the frame having a recess, a diaphragm mounted in said recess, a cap overlying the recess forming with the diaphragm a chamber of which the diaphragm is a movable wall, said chamber having an inlet for working fluid under pressure, a spring and a rod confined between the members of the frame, the rods being arranged to transmit motion from the diaphragm to the valve, and a spring to resist displacement of the diaphragm by the working fluid.

In testimony whereof I have affixed my signature.

FRANK H. HOPKINS.

Copies of this patent may be obtained for five cents each, by addressing the "Commissioner of Patents, Washington, D. C."